United States Patent [19]

Nichols

[11] Patent Number: 5,109,525
[45] Date of Patent: Apr. 28, 1992

[54] TWO-WAY RADIO WITH VOICE STORAGE

[75] Inventor: Daniel K. Nichols, Sunrise, Fla.

[73] Assignee: Delaware, Schaumberg, Ill.

[21] Appl. No.: 644,754

[22] Filed: Jan. 23, 1991

Related U.S. Application Data

[63] Continuation of Ser. No. 279,001, Dec. 2, 1988, abandoned.

[51] Int. Cl.$^5$ .......................... H04B 1/40; H04B 1/50
[52] U.S. Cl. .......................................... 455/74; 455/78; 455/89; 375/5
[58] Field of Search ....................... 455/78, 79, 82, 89, 455/74; 369/6, 7; 370/61; 375/5

[56] References Cited

U.S. PATENT DOCUMENTS

| | | | |
|---|---|---|---|
| 4,457,018 | 6/1984 | Takayama | 455/79 |
| 4,468,813 | 8/1984 | Burke et al. | 455/38 |
| 4,495,647 | 1/1985 | Burke et al. | 455/38 |
| 4,589,132 | 5/1986 | Botbol et al. | 381/51 |
| 4,716,576 | 12/1987 | Sakai et al. | 455/31 |
| 4,742,514 | 5/1988 | Goode et al. | 455/54 |
| 4,795,647 | 1/1985 | Burke et al. | 455/5 |
| 4,821,310 | 4/1989 | Lynk, Jr. et al. | |

*Primary Examiner*—Reinhard J. Eisenzopf
*Assistant Examiner*—Lisa D. Charouel
*Attorney, Agent, or Firm*—Daniel K. Nichols; Pedro P. Hernandez

[57] ABSTRACT

A two-way radio includes a receiver having a squelch circuit for determining if a communication channel is available. A transmitter is provided for transmitting voice messages on the channel. When the communication channel is available, voice signals are directed from a microphone to the transmitter for transmission. When the communication channel is not available, the voice signals are automatically directed to a digitizer there they are digitized. The digitized voice signals are stored in a memory for later transmission when the channel becomes available.

5 Claims, 2 Drawing Sheets

TWO-WAY RADIO WITH VOICE STORAGE

This is a continuation of application Ser. No. 07/279,001, filed Dec. 2, 1988, and now abandoned.

BACKGROUND OF THE INVENTION

This invention relates to two-way radios in general, and in particular to radios having a voice storage means, which can be utilized to store and later transmit a voice message. Known voice storage radios are utilized for voice mailbox purposes. That is, voice messages are either received and stored by the radio for later review, or the message is stored and later transmitted on command or request. These approaches provide for either incoming or outgoing voice mail.

When radios are operated on shared frequencies, it is important that only a single radio transmit on any give frequency, within a geographical area at a time. Where a radio is operating in a carrier squelch mode, the user can readily ascertain if the channel is in use by whether the radio is unsquelched, in which case the radio is producing an audio output. For coded squelch operation, such as subaudible tone or digital code, a monitor switch is often provided to permit the radio user to defeat the coded squelch operation to monitor the channel for activity. Some systems provide automatic transmit inhibit, preventing transmission by the radio if a signal is present on the channel.

Where a radio user desires to transmit a message on a busy channel, he must wait until the channel is clear prior to articulating the message. This is often a disruption to the user who wishes to proceed with other activities, but instead must remain ready to actuate the radio and talk when the channel becomes available. It is desirable to provide a means permitting the user to articulate his message inspite of a busy condition on the channel.

SUMMARY OF THE INVENTION

This radio with voice storage permits the user to articulate a voice message regardless of whether the channel is busy. The two-way radio includes a receiver with means for determining if a communication channel is available. A transmitter is provided for transmitting voice messages on the communication channel. The radio includes voice input means and voice storage means. A control means is responsive to the voice input means and the receiver means to direct voice messages from the voice input means to the transmitter for transmission when the communication is available. When the communication channel is not available, voice messages are directed to the voice storage means for later transmission when the channel is available.

In one aspect of the invention, the control means is further responsive to the receiver means to direct voice messages from the voice storage means to the transmitter for transmission when the communication channel becomes available. In another aspect of the invention, the receiver means includes a squelch circuit. In still another aspect of the invention, the voice input means includes a microphone and an activation switch. In yet another aspect of the invention, the voice storage means includes a digitizer for digitizing voice signals and a memory for storing the digitized voice signals. In another aspect of the invention, the voice storage means includes a digital-to-analog converter for converting digitized voice signals to analog signals prior to transmission.

DESCRIPTION OF THE PREFERRED EMBODIMENT

Figure 1:
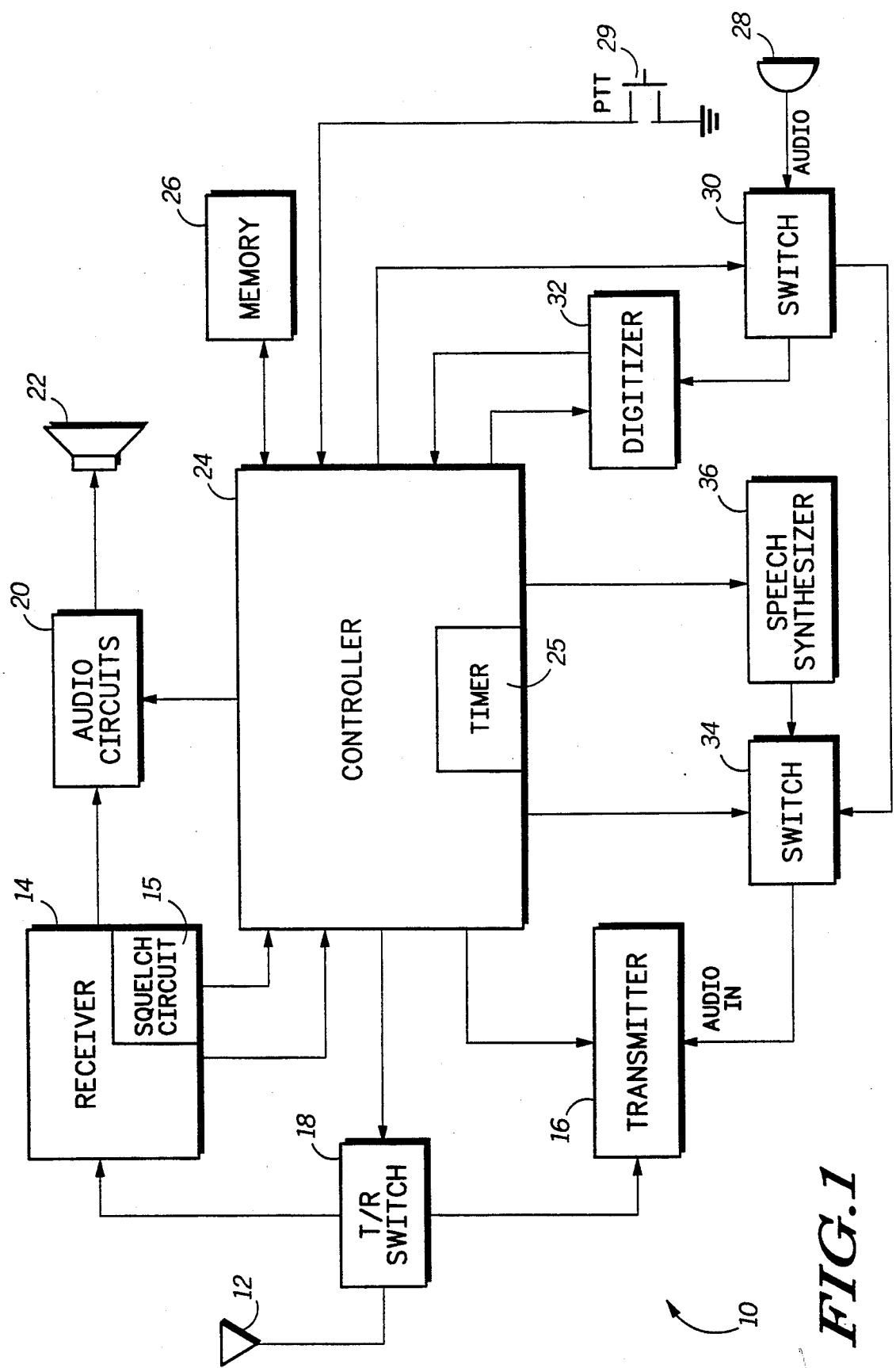
FIG. 1 is a block diagram of a two-way radio in accordance with the present invention.

Referring now by characters of reference to the drawings, and first to FIG. 1, it will be understood that a two-way radio 10 includes an antenna 12 which is selectively connected to a receiver 14 or to a transmitter 16 by a T/R switch 18 in a conventional manner. Received audio signals from receiver 14 are applied to audio circuits 20 for amplification prior to being applied to a speaker 22. The receiver 14 includes a squelch circuit 15 which provides a squelch output that is applied to an input of a controller 24. An output of controller 24 provides a mute control signal to audio circuits 20. The controller 24, which preferably comprises a microprocessor, is connected to a memory 26 in a conventional manner. The controller also includes output lines for controlling the T/R switch 18, receiver 14 and transmitter 16.

A microphone 28, comprising voice input means, includes a push-to-talk (PTT) switch, comprising an activation switch, which provides a control signal to an input of controller 24. Audio signals from microphone 28 are supplied to a switch 30, which is controlled by an output line of controller 24. One output of switch 30 is connected to the input of a digitizer 32 which is used to digitize voice signals and supply the digitized signals to controller 24 for storage in memory 26. The digitizer 32 operates under the control of controller 24 which may process the digitized signals prior to storage using known data compression or protection techniques. Another output of switch 30 is connected to an input of a second switch 34 which is also controlled by controller 24. A speech synthesizer 36 is connected to the controller for receiving digitized voice signals from controller 24. The output of speech synthesizer 36 is connected to a second input of switch 34. The output of switch 34 supplies the audio input signal to the transmitter 16.

Figure 2:
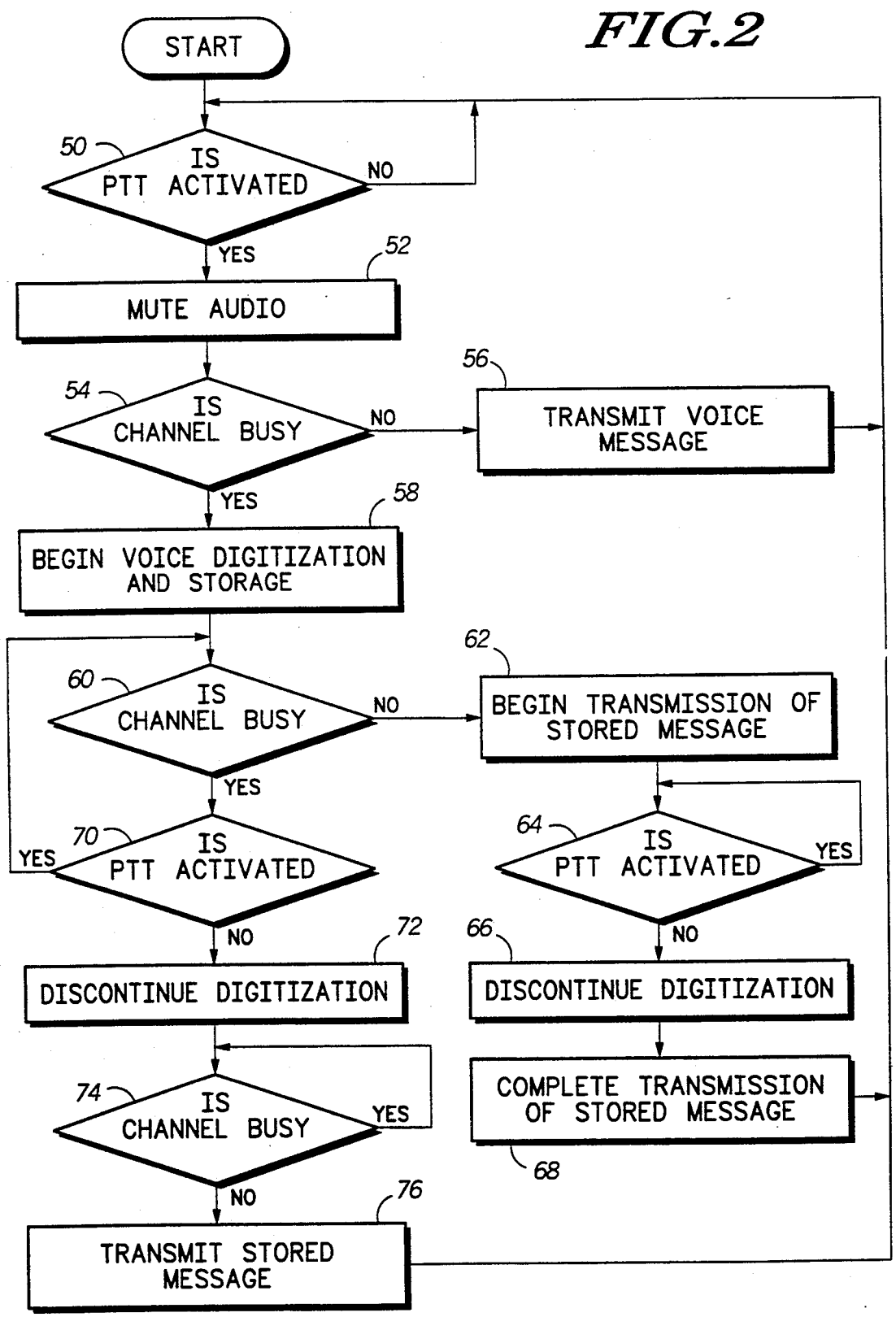
FIG. 2 is a flowchart illustrating the operation of the radio of FIG. 1.

The operation of radio 10 may be best understood by reference to flow chart of FIG. 2. The controller 24 monitors the PTT signal from microphone 28. As illustrated at decision block 50, if the PTT switch is not actuated, the controller continues to monitor the PTT signal. If the PTT switch is actuated, the controller 24 mutes the audio circuits 20 (block 52) and determines if the channel is busy based upon the squelch signal of receiver 14 (block 54). If the channel is not busy the voice message is transmitted (block 56). Controller 24 actuates switches 30 and 34 to route audio signals from microphone 28 to transmitter 16, which is actuated on and T/R switch 18 connects antenna 12 to the transmitter output for radiating the modulated RF signals. When the PTT switch is released, transmission ceases and the receiver can be unmuted if their is a signal present on the channel. In the event that the channel is busy when the PTT is actuated, the radio begins voice digitization and storage (block 58). Switch 30 is actuated to route audio signals from microphone 28 to digitizer 32. The digitized signals are stored in memory 26. The controller 24 continues to monitor the receiver squelch output during this process (block 60). The storage continues as long as the channel remains busy and the PTT remains actuated (subject to available memory capacity).

If the channel becomes available during the digitization process, the stored speech is synthesized and transmitted while continuing to digitized the voice signal (block 62). The controller 24 reads the stored digitized voice from the memory 26 and applies it to speech synthesizer 36. Switch 34 is actuated to supply the synthesized speech to the transmitter 16, which is actuated on and its output is applied via T/R switch 18 to antenna 12. As long as the PTT 29 remains actuated (block 64), additional voice signals continue to be digitized and stored. When the PTT is released, digitization and storage ceases (block 66) but the transmission continues until the complete message has been synthesized and transmitted (block 68). Where the complete message has been digitized prior to the channel becoming available, as indicated by the PTT not being actuated at block 70, digitization ceases when the PTT 29 is released (block 72). The controller 25 monitors the squelch signal until the channel becomes available (block 74). The stored message is then synthesized and transmitted (block 76).

By digitizing and storing voice messages, channel interference is avoided and the user of the radio 10 is able to enter a voice message without delay and without any user intervention other than the normal actuation of a PTT switch or its equivalent. While the controller 24 uses the receiver squelch signal to determine channel availability, the controller can include a timer 35 for adding a random time delay at blocks 54, 60, and 74 prior to deciding that the channel is not busy. This will delay initiation of transmissions to resolve contention issues on the channel.

I claim as my invention:

1. A two-way radio comprising:
    a receiver including a squelch circuit for determining if a communication channel is available;
    a transmitter for transmitting voice messages on the communication channel;
    voice input means including a microphone and an activation switch;
    voice storage means including a digitizer for digitizing voice signals and a memory for storing digitized voice signals; and
    control means responsive to the activation switch and to said squelch circuit, the control means automatically directing voice signals from the microphone to the transmitter for transmission without digitizing or storing the voice message if the communication channel is available and to the digitizer for digitizing and then to the voice storage means for storage in the memory if the communication channel is not available.

2. A two-way radio as defined in claim 1, in which:
    the control means is further responsive to said receiver means to automatically direct voice messages from the voice storage means to the transmitter for transmission when said communication channel becomes available.

3. A two-way radio as defined in claim 1, in which:
    the voice storage means further includes a digital-to-analog converter for converting stored digitized voice signals to analog signals prior to transmission.

4. A two-way radio comprising:
    a receiver including a squelch circuit for determining if a communication channel is available;
    a transmitter for transmitting voice messages on the communication channel;
    voice input means including a microphone and an activation switch;
    voice storage means including a digitizer for digitizing voice signals and a memory for storing digitized voice signals, the voice storage means further includes a digital-to-analog converter for converting stored digitized voice signals to analog signals prior to transmission; and
    control means responsive to the activation switch and to said squelch circuit, the control means automatically directing voice signals from the microphone to the transmitter for transmission without digitizing or storing the voice message if the communication channel is available and to the voice storage means for storage in the memory if the communication channel is not available, the control means is further responsive to said receiver means to automatically direct messages from the voice storage means to the transmitter for transmission when said communication channel becomes available.

5. The two-way radio of claim 4, further including:
    a timer means for adding a random time delay to any messages which are stored in the storage means prior to the message being transmitted by the transmitter after the communication channel becoming available.

* * * * *